L. M. PERKINS.
SYSTEM OF CONTROL.
APPLICATION FILED MAR. 7, 1916.

1,308,106.

Patented July 1, 1919.

WITNESSES:

INVENTOR
Laurence M. Perkins.
BY
ATTORNEY

UNITED STATES PATENT OFFICE.

LAURENCE M. PERKINS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,308,106.  Specification of Letters Patent.  Patented July 1, 1919.

Application filed March 7, 1916. Serial No. 82,628.

*To all whom it may concern:*

Be it known that I, LAURENCE M. PERKINS, a citizen of the United States, and a resident of Wilkinsburg, in the county of Allegheny and State of Pennsylvania, have invented a new and useful Improvement in Systems of Control, of which the following is a specification.

My invention relates to systems of control for dynamo-electric machines and especially to the regenerative control of electric railway vehicle motors and the like.

In a co-pending application of R. E. Hellmund, Serial No. 44,443, filed August 9, 1915, and assigned to the Westinghouse Electric & Manufacturing Company is shown a regenerative-control system of the above-indicated character wherein an auxiliary source of energy, such as a dynamotor or motor generator set, is employed for exciting the field windings of the momentum-driven machines, the arrangement of parts being such that an inherent and automatic decrease of regenerative voltage is effected upon an incipient increase of the main current, whereby a desirable negative compounding effect is provided in the system and a relatively stable system of regeneration obtains.

However, under certain emergency conditions, such as the interruption of supply-circuit voltage by reason of the trolley leaving the supply-circuit conductor or passing a section break, it has been found that the regenerated voltage instantaneously rises to a relatively high value because of the above-mentioned inherent regulating features of the system. Inasmuch as the exciting dynamotor or motor-generator set is connected in parallel relation to the main machines, it follows that such rise of voltage tends to effect an increase in speed of the auxiliary machines, which, in turn, causes an increase of the main field-winding excitation and the regenerated voltage, and thus the cycle continues until "flash-over" conditions are obtained in the motor of the motor-generator set or in the dynamotor in the course of a second or so.

The object of my present invention is to provide a relatively simple and effective means for obviating the above-mentioned difficulties, said means comprising, in general, an auxiliary generating machine that is rotatable with the motor-generator set or dynamotor and is associated therewith in such manner as to exert a differential effect thereupon under the above-mentioned emergency conditions and thus prevent the undesirable results just recited.

Figure 1:
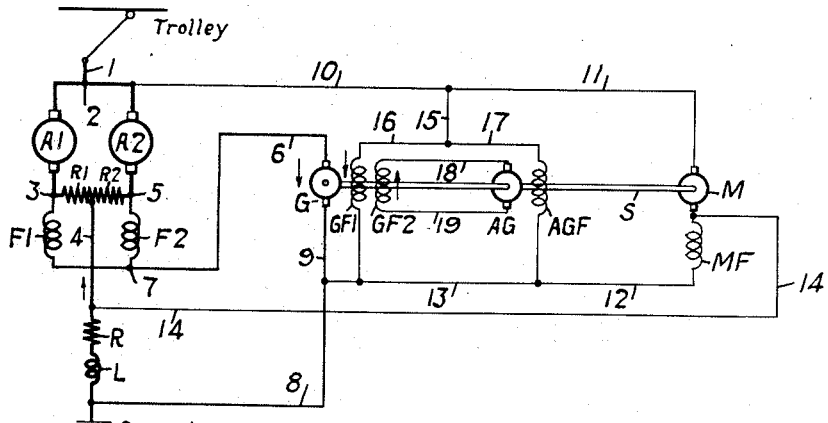
Figure 2:
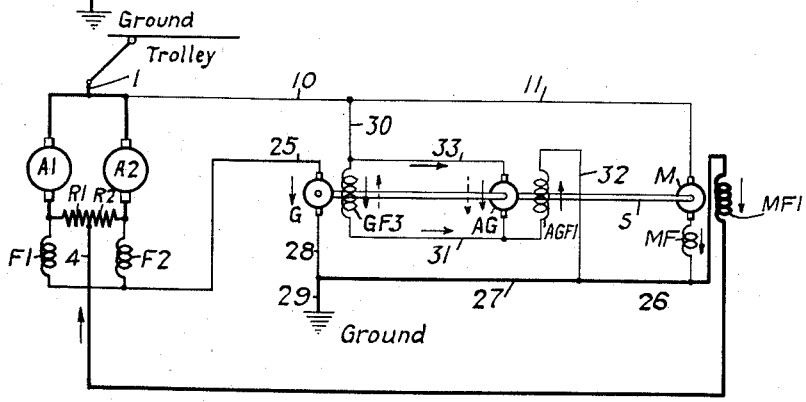
Figure 3:
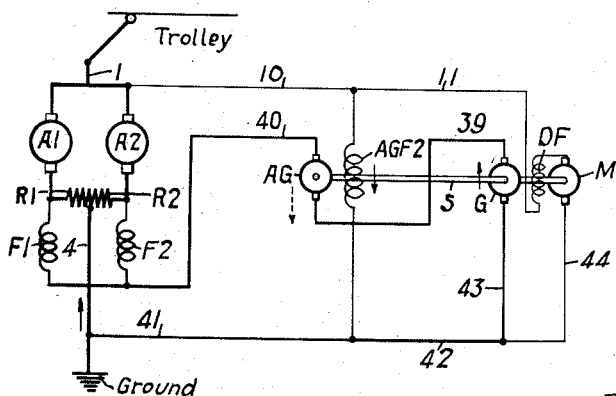
Figure 4:
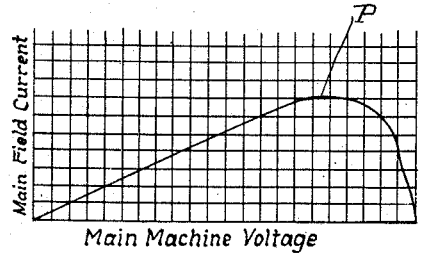

My invention may best be understood by reference to the accompanying drawing, wherein Figure 1 is a diagrammatic view of the main and the auxiliary circuit connections of a system of control embodying my invention; Fig. 2 and Fig. 3 are similar views of modifications of my invention; and Fig. 4 is a curve chart serving to illustrate the operation of the auxiliary machine that is employed in my system.

Referring to Fig. 1, the system shown comprises a plurality of suitable supply-circuit conductors respectively marked Trolley and Ground; a plurality of main dynamo-electric machines respectively having armatures A1 and A2 and field-magnet windings F1 and F2 of the series type; a plurality of main-circuit variable resistors R1 and R2 that are employed during the regenerative period in a manner to be described; a motor-generator set or dynamotor having a motor-armature winding M and an exciting-generator armature winding G; an auxiliary-generator armature winding AG, here shown as mounted on the same shaft $s$ as the armatures M and G; and a plurality of translating devices comprising a resistor R and an inductance L that are disposed in the main motor circuit and are associated with the auxiliary machines in a manner to be set forth.

The motor armature M is provided with a field winding MF of the series type, while the armature windings G and AG are respectively supplied with supply-circuit-excited field windings GF1 and AGF, and the exciting armature G is also provided with a second field winding GF2 that is differentially disposed with respect to the field winding GF1 and is energized from the auxiliary armature AG.

Assuming that regenerative operation of the momentum-driven machines has been inaugurated in any suitable manner, the various circuits established and the inherent and automatic operation of the system may be described as follows: The main machine circuits are established from the trolley through conductor 1 to a junction-point 2 where the circuit divides, one branch including main armatures A1, junction-point 3, variable resistor R1, conductor 4, and the translating devices R and L to the negative conductor Ground. The other branch includes the main armature A2, junction-point 5 and the main resistor R2, which is connected to the conductor 4.

One terminal of the exciting armature G is connected through conductor 6, to junction-point 7 where the circuit divides, one branch including main field winding F1 and variable resistor R1, and the other branch including main field winding F2 and variable resistor R2, whence a common circuit is completed through conductor 4, the translating devices R and L and conductors 8 and 9 to the other terminal of the armature G.

The driving motor armature M of the motor-generator set is connected in parallel relation to the main machines, and its circuit is established from the junction-point 2 through conductors 10 and 11, armature winding M, field winding MF and conductors 12, 13 and 8 to the negative conductor Ground. A point intermediate the armature winding M and the field winding MF is connected through conductor 14 to the outer terminal of the translating device R, whereby the field winding MF is connected across the translating devices R and L for a purpose to be hereinafter set forth.

An auxiliary field circuit is completed from the conductor 10 through conductor 15 where the circuit divides, the branches thereof respectively including conductor 16 and field winding GF1 of the exciting armature G, and conductor 17 and field winding AGF of the auxiliary armature AG, whence circuit is completed through the common conductors 13 and 8 to the negative conductor Ground. The second and differentially-disposed field winding GF2 of the exciting armature G is connected through conductors 18 and 19 in series relation with the auxiliary armature AG, and such differential arrangement is denoted by the arrows in the drawing.

The purpose of the translating devices R and L is to produce a differential compounding effect on the motor generator set in the following manner: When a relatively heavy current is flowing through the main machine circuit and, consequently, through the translating devices in question, the total impedance drop across the translating devices superposes a certain correspondingly high voltage upon the field winding MF, thereby increasing the current traversing the field winding and, consequently, reducing the speed of the motor-generator set by a predetermined amount. Conversely under relatively light-current conditions in the main circuit, an accordingly light voltage is impressed from the translating devices upon the auxiliary field winding MF, and the motor-generator set is thus caused to increase its speed by a predetermined degree. However, it will be understood that various other well-known means for compounding the driving motor of the motor-generator set may be employed, if desired, or the compounding effect may be omitted, as is done in the system that is illustrated in Fig. 3.

The particular arrangement of main-circuit connections is immaterial to my present invention, as will be appreciated, although the invention is particularly adapted for use with a system such as that shown and described in the above-mentioned co-pending application wherein the inherent regulating features already referred to are present. Consequently, no further description of the main-circuit connections or mode of operation thereof is deemed necessary. It may be observed, however, that the main armature current and corresponding main field-winding current traverses the main-circuit resistors R1 and R2 in the same direction, and thus an increase of armature or regenerated current has the effect of inserting an additional voltage drop in the regulating circuit of the corresponding main field winding, thus reducing the available exciting voltage from the constant-voltage generator armature winding G, whereby an inherent negative compounding effect is obtained.

The design and arrangement of the various auxiliary armatures and field windings in the system are such that, under normal regenerating conditions, the inherent regulating effect just recited is permitted to any desired degree, but, under emergency conditions, such as the interruption of supply-circuit voltage from any cause whatever, the main armatures A1 and A2 tend to produce a sudden dangerous rise of voltage in accordance with the principles hereinbefore mentioned. Under such incipient voltage-rise conditions, however, the voltage impressed upon the motor armature M is correspondingly increased, thereby augmenting the generated voltages of the other or driven armatures G and AG and also increasing the excitation of the supply-circuit-excited auxiliary field windings GF1 and AGF. The auxiliary armature winding AG thus has its voltage increased in two ways, namely, by the increase in speed of the motor-generator set and by the increase of excitation of the field winding AGF, with the result that the excitation furnished to the field winding GF2 of the exciting armature G is sufficient to overcome the combined effect of the increase of speed and of field excitation thereof, with the final result that the differential actions of the two field windings GF1 and GF2 collectively produce a lower voltage on the exciting armature winding G and, consequently, a decreased main field-winding current. Thus, a dangerous rise of regenerated voltage, under the above-described emergency condition, is inherently and automatically prevented, it being understood that the above-recited operation occurs at a relatively rapid rate and the actual rise of regenerated voltage is relatively small.

The general operation of the exciting system is graphically illustrated in the chart of Fig. 4 wherein the main field-winding current, which corresponds to the voltage of the armature winding G is plotted against the main machine or regenerated voltage. It will be observed that the main field current is permitted to increase in accordance with the previously-described inherent regulating effect until a predetermined crucial point P is reached beyond which it is dangerous to allow the field-winding current to go, in order to prevent "flash-over" conditions of the driving motor armature M. When the point P is attained, the above-mentioned differential action of the auxiliary-generator winding AG causes the voltage of the exciting armature G and, therefore, the field-winding current of the main machines to drop off, as illustrated in the curve. It will be appreciated that the regulating operation in question may be expounded mathematically, but is not believed that such an explanation is necessary in view of the use of Fig. 4.

Referring now to Fig. 2, the system shown comprises, in addition to the main dynamo-electric machines, the resistors R1 and R2, the auxiliary armatures M, G and AG and the field winding MF of the armature M, a field winding GF3 for the armature G, a field winding AGF1 for the auxiliary armature AG and a second field winding MF1 for the driving armature M.

One terminal of the exciting armature G is connected through conductor 25, the main field windings and main-circuit resistors, as previously described in connection with Fig. 1, conductor 4, the field winding MF1 of the driving armature M, and conductors 26, 27 and 28 to the other terminal of the generator armature winding G. As in Fig. 1, the conductor 28, which corresponds to conductor 9, is connected through conductor 29 to ground.

An auxiliary field-winding circuit is completed from the conductor 10 through conductor 30, field winding GF3 of the exciting armature G, conductor 31, field winding AGF1 of the auxiliary armature AG and conductor 32 to the negatively-connected conductor 27. One terminal of the auxiliary armature AG is connected to the conductor 31, while the other terminal thereof is connected through conductor 33 to the conductor 30, whereby the armature AG is connected in parallel relation to the field winding GF3 of the exciting armature G. As indicated by the dotted arrows, the voltage of the armature AG opposes the portion of the supply-circuit voltage that is impressed upon the field winding GF3.

Assuming that normal regenerative conditions are effected in any suitable manner, the inherent regulating operation of the auxiliary machines under the emergency conditions may be set forth as follows: The incipient increase of regenerated voltage of the main armatures tends to speed up the dynamotor or motor-generator set and thereby increase the voltage that is delivered by the exciting armature G. However, the simultaneous increase of speed and excitation of the armature AG serves to counteract the increased current traversing the field winding GF3 from the supply circuit, the effective excitation of the armature G being reduced in approximately direct proportion to the rise of regenerated voltage. In order to prevent a virtual short-circuit across the supply-conductors in case the voltage of the armature AG rises to a sufficient value to entirely nullify the resistance drop of the field winding GF3, the field winding AGF1 or some other resistance device should be connected in series relation with the field winding GF3. In addition, the decreased voltage of the exciting armature G causes a decreased current to flow through the field winding MF1 of the driving armature M, the total field flux of the motor, however, either not varying sufficiently to materially affect the speed of the driving armature M and thus not preventing the regulating operation that is desired, or else varying in such a way as to aid in the regulation. In the present case also, it will be understood that the regulating action in question occurs at a relatively rapid rate to prevent any dangerous rise of regenerated voltage of the main machines under emergency conditions.

In Fig. 3, in addition to the main machine circuits as illustrated in the previous figures and a dynamotor having a driving armature winding M and a generating armature winding G which are provided with a common field-magnet winding DF, as is customary, the system comprises an auxiliary generator armature AG that is disposed upon the shaft s of the dynamotor, and a supply-circuit-excited field winding AGF2 for the auxiliary armature winding AG.

One terminal of the exciting armature G is connected through conductor 39, the auxiliary armature AG, the voltage of which opposes the voltage of the armature G, conductor 40, the main field windings and the main-circuit resistors, as previously described, and conductors 41, 42 and 43 to the other terminal of the exciting armature winding G.

The driving armature circuit is completed from the conductor 11 through the field winding DF, the dynamo armature M and conductor 44 to the negatively-connected conductor 42.

The auxiliary field winding AGF2 is connected between conductors 10 and 41 and is thus connected directly across the main motor circuits.

Assuming that normal regeneration is in operation and that the above-mentioned emergency conditions arise, the inherent regulation operation of the auxiliary system may be described as follows: The increased voltage impressed upon the driving armature M correspondingly increases the voltage of the armature G, but the opposing voltage of the auxiliary armature AG is also increased by the increased speed of the dynamotor and by the augmented excitation of the supply-circuit-excited field winding AGF2. It will be understood that the design of parts is such that the voltage of the auxiliary armature AG increases at a greater rate than the voltage of the armature G and, consequently, at the crucial point P of the curve in Fig. 4, the combined voltage that is impressed upon the main-field-winding circuit is decreased in accordance with the curve, and the above-mentioned dangerous rise of the regenerated voltage under the emergency conditions is prevented.

It will be appreciated that, in addition to the hereinbefore described function of the auxiliary motor-generator set or dynamotor, the machines may be employed for the customary purpose of driving air compressors or furnishing energy for lighting the vehicle, etc.

Obviously, various modifications of the circuit connections and location and arrangement of parts herein set forth may be effected without departing from the spirit and scope of my invention and I desire, therefore, that only such limitations shall be imposed as are indicated in the appended claims.

I claim as my invention:

1. In a system of control, the combination with a supply circuit and a dynamo-electric machine adapted for regeneration thereto and having an armature and a field winding, of auxiliary exciting means for said field winding during the regenerative period, and means coöperating with said exciting means affected by changes in voltage of the dynamo-electric machine incident to an interruption of supply-circuit voltage for preventing a dangerous rise of regenerated voltage upon an interruption of supply-circuit voltage.

2. In a system of control, the combination with a supply circuit and a dynamo-electric machine adapted for regeneration thereto and having an armature and a field winding, of auxiliary exciting means for said field winding during the regenerative period, and means coöperating with said exciting means affected by changes in voltage of the dynamo-electric machine incident to an interruption of supply-circuit voltage for preventing the field-winding current from exceeding a predetermined value upon an interruption of supply-circuit voltage.

3. In a system of control, the combination with a supply circuit and a main dynamo-electric machine adapted for regeneration thereto and having an armature and a field-winding, of auxiliary exciting dynamo-electric means for the main field winding during the regenerative period, and dynamo-electric means coöperating with said auxiliary dynamo-electric means affected by changes in voltage of the dynamo-electric machine incident to an interruption of supply-circuit voltage for decreasing the effect of said auxiliary dynamo-electric means to prevent the regenerated voltage from exceeding a certain value under predetermined conditions.

4. In a system of control, the combination with a supply circuit and a main dynamo-electric machine adapted for regeneration thereto and having an armature and a field winding, of auxiliary exciting dynamo-electric means for the main field winding during the regenerative period, and dynamo-electric means electrically coöperating with said exciting dynamo-electric means affected by changes in voltage of the dynamo-electric machine incident to an interruption of supply-circuit voltage for decreasing the exciting effect of said exciting dynamo-electric means to prevent the main field excitation from exceeding a certain value upon an interruption of supply-circuit voltage.

5. In a system of regenerative control, the combination with a supply circuit and a dynamo-electric machine adapted for regeneration thereto and having an armature and a field winding, of auxiliary exciting means electrically associated with the machine circuit to inherently and automatically effect a compensating decrease of field-winding current upon an incipient increase of armature voltage under normal regenerating conditions, operating means energized from the main machine for said exciting means, and auxiliary means for counteracting an incipient surge of regenerated voltage and a consequent increased effect of said operating and said exciting means upon an interruption of supply-circuit voltage.

6. In a system of regenerative control, the combination with a supply circuit and a main dynamo-electric machine adapted for regeneration thereto and having an armature and a field winding, of auxiliary exciting dynamo-electric means electrically associated with the machine circuit to inherently and automatically effect a compensating decrease of field-winding current upon an incipient increase of armature voltage under normal regenerating conditions, driving dynamo-electric means energized from the main machine for said exciting means, and auxiliary dynamo-electric means rotatable with said driving means and electrically related to said exciting means for counterbalancing an incipient surge of regenerated voltage and a consequent increased effect of said driving and said exciting means under predetermined abnormal conditions.

7. In a system of regenerative control, the combination with a supply circuit and a main dynamo-electric machine adapted for regeneration thereto and having an armature and a field winding, of a variable resistor in circuit with said machine during regenerative operation, an auxiliary exciting armature connected in series relation with said field winding across said resistor, whereby a compensating increase of field-winding current inherently and automatically obtains upon an incipient increase of main armature voltage under normal regenerating conditions, a driving armature energized from the main machine for said exciting armature, and an auxiliary dynamo-electric machine operated by said driving armature and electrically associated with said exciting armature for counterbalancing an incipient surge of regenerated voltage and a consequent increased speed of said driving means upon an interruption of supply-circuit voltage.

8. In a system of regenerative control, the combination with a supply circuit and a main dynamo-electric machine adapted for regeneration thereto and having an armature and a field winding, of an exciting armature electrically associated with the main field winding to inherently and automatically effect a compensating decrease of field-winding current upon an incipient increase of armature voltage under normal regenerating conditions, a motor armature energized from the main machine for driving said exciting armature, and an auxiliary dynamo-electric machine armature driven by said driving armature, a plurality of supply-circuit-excited field windings for said exciting armature and said auxiliary armature, respectively, and a second field winding for said exciting armature energized from said auxiliary armature and differentially disposed with respect to the associated supply-circuit-excited field winding.

9. In a system of regenerative control, the combination with a supply circuit and a main dynamo-electric machine adapted for regeneration thereto and having an armature and a field winding, of an exciting armature electrically associated with the main field winding to inherently and automatically effect a compensating decrease of field-winding current upon an incipient increase of armature voltage under normal regenerating conditions, a motor armature and a field winding therefor energized from the main machine for driving said exciting armature, an auxiliary dynamo-electric machine armature driven by said driving armature, a second field winding for said motor armature differentially disposed with respect to the first field winding therefor and a plurality of supply-circuit excited field windings for said exciting armature and said auxiliary armature, the field winding for said exciting armature being also energized from said auxiliary armature.

10. In a system of regenerative control, the combination with a supply circuit and a main dynamo-electric machine adapted for regeneration thereto and having an armature and a field winding, of an exciting armature electrically associated with the main field winding to inherently and automatically effect a compensating decrease of field-winding current upon an incipient increase of armature voltage under normal regenerating conditions, a motor armature energized from the main machine for driving said exciting armature, an auxiliary dynamo-electric machine armature driven by said driving armature and connected in series opposing relation with said exciting armature, and a supply-circuit-excited field winding for the auxiliary armature.

11. In a system of regenerative control, the combination with a supply circuit and a momentum-driven dynamo-electric machine, of auxiliary exciting means for said machine, means for counteracting variations of regenerated current upon changes in supply-circuit voltage, and means coöperating with said exciting means affected by changes in voltage of the dynamo-electric machine incident to an interruption of supply-circuit voltage for preventing an excessive rise of regenerated voltage in case of a supply-circuit voltage interruption while maintaining the system connections unchanged.

12. In a system of regenerative control, the combination with a supply circuit and a momentum-driven dynamo-electric machine having an armature and a field winding, of auxiliary means for exciting said field winding, means for inherently counteracting variations of regenerated current upon changes in supply-circuit voltage, and means coöperating with said exciting means affected by changes in voltage of the dynamo-electric machine incident to an interruption of supply-circuit voltage for preventing an excessive rise of regenerated voltage in case of a supply-circuit voltage interruption without varying the system connections.

In testimony whereof, I have hereunto subscribed my name this 29th day of Feb., 1916.

LAURENCE M. PERKINS.